US008680476B2

(12) United States Patent
Webster et al.

(10) Patent No.: US 8,680,476 B2
(45) Date of Patent: Mar. 25, 2014

(54) BETA RADIATION MONITOR AND METHOD (75) Inventors: Neil Andrew Webster, Newbury (GB);
John Stanley Usher, Reading (GB);
Christopher Edward Hill, Caithness (GB); Michael Hodgson, Reading (GB)

(73) Assignee: Thermo Electron Limited, Cambridge (GB)

( * ) Notice: Subject to any disclaimer, the term of this patent is extended or adjusted under 35 U.S.C. 154(b) by 139 days.

(21) Appl. No.: 13/133,622

(22) PCT Filed: Dec. 9, 2009

(86) PCT No.: PCT/GB2009/002849
§ 371 (c)(1),
(2), (4) Date: Jun. 8, 2011

(87) PCT Pub. No.: WO2010/067068
PCT Pub. Date: Jun. 17, 2010

(65) Prior Publication Data
US 2011/0315889 A1    Dec. 29, 2011

(30) Foreign Application Priority Data
Dec. 9, 2008    (GB) .................................... 0822480.0

(51) Int. Cl.
*G01T 1/185*    (2006.01)
(52) U.S. Cl.
USPC ............................ 250/374; 250/375; 250/379
(58) Field of Classification Search
USPC ........................................................ 250/374
See application file for complete search history.

(56) References Cited

U.S. PATENT DOCUMENTS

| 2,656,476 | A | | 10/1953 | Firminhac | |
|---|---|---|---|---|---|
| 4,543,483 | A | * | 9/1985 | Genrich | 250/374 |
| 5,192,868 | A | * | 3/1993 | Dudley | 250/374 |
| 6,724,196 | B1 | * | 4/2004 | Chiaro et al. | 324/609 |

FOREIGN PATENT DOCUMENTS

| CN | 2854570 Y | 1/2007 |
|---|---|---|
| FR | 2553897 | 4/1985 |
| GB | 1015031 A | 12/1965 |
| GB | 1042113 A | 9/1966 |
| GB | 2 150 743 A | 7/1985 |
| GB | 2150743 A | 7/1985 |

OTHER PUBLICATIONS

Aoyama et al., "A New Type of <3>H Surface-Contamination Monitor," Health Physics, vol. 48, (6), 1985, pp. 773-779.

(Continued)

*Primary Examiner* — Marcus Taningco
(74) *Attorney, Agent, or Firm* — Gordon Stewart (57) ABSTRACT A beta radiation monitor (70,90), comprising a gas flow proportional detector (60) for detecting beta radiation emitted by a beta emitter external to the detector; a fill gas supply (51) configured to supply a fill gas to the detector, wherein the fill gas comprises nitrogen; a temperature sensor (72) for measuring temperature; and a controller (64) in communication with the temperature sensor for adjusting an operational parameter of the monitor in accordance with the measured temperature. The operational parameter may comprise a voltage applied across the fill gas, which may be thermistor controlled, or a beta radiation detection threshold of the detector. The fill gas is supplied by a nitrogen generator. The gas flow proportional detector may be a large-area detector.

32 Claims, 4 Drawing Sheets (56) References Cited

OTHER PUBLICATIONS

Aoyama et al., "Sensitive region of air proportional counters and its dependence on the pressure, temperature and humidity of filling air," Nuclear Instruments and Methods in Physics Research, vol. A322 (2), 1993, pp. 170-176.

English language machine translation of CN 2854570 obtained Apr. 1, 2013 from http://worldwide.espacenet.com.

* cited by examiner

BETA RADIATION MONITOR AND METHOD

FIELD OF THE INVENTION

The present invention relates to a beta radiation monitor and a method of monitoring beta radiation; in particular, to beta radiation monitoring using gas flow proportional detection.

BACKGROUND OF THE RELATED ART

A radioactive nucleus undergoing beta decay emits ionising radiation in the form of a beta particle, which is a high-speed electron or positron. Beta emitters are used in medical diagnosis and treatment and in industrial thickness gauges and are also formed as fission products from nuclear reactions. The ionising nature of beta radiation presents a potential health hazard in that it can cause serious human tissue damage, especially from within the body. As such, radioactive contamination monitors are important for monitoring contamination of personnel who may be exposed to radiation.

Radioactive contamination monitors can employ a variety of detector technologies, including scintillation detectors, solid-state detectors, and gaseous detectors. A scintillation detector comprises a scintillator whose fluorescence, when excited by ionising radiation, is measured using a photomultiplier tube.

In solid-state detectors, the ionizing radiation interacts with the semiconductor material and excites electrons out of the valence band and into the conduction band. An applied electric field causes a measurable net migration of the electrons and holes left behind.

Gaseous detectors include Geiger-Müller (GM) tubes, ionisation chambers, sealed-gas proportional counters and gas flow proportional counters. Gaseous detectors measure the ionisation of a fill gas (also called a counting gas) by ionising radiation, by generating an electric field across the fill gas and measuring the electric output resulting from the ionisation event.

A GM tube operates with a large voltage across the fill gas, between the cathode tube wall and a central anode. The fill gas comprises an inert gas, such as helium, neon or argon. Any ionising radiation entering the tube ionises the fill gas and the resulting ions and electrons are accelerated to the cathode and anode, respectively. The electrons gain sufficient kinetic energy to cause further ionisation and the resulting electron avalanche produces a large current pulse at the anode. The pulse is amplified and detected, but there is no information in the amplitude or shape of the pulse about the type of radiation which caused the pulse; the pulse is the same whatever the type of ionising radiation causing the pulse (i.e. regardless of the number of original ion pairs produced by the ionizing radiation). Levels of radiation are measured by the number of pulses counted (with background count rates measured and subtracted as appropriate).

By contrast, an ionisation chamber typically has a relatively lower voltage applied between its electrodes. As such, individual ions and electrons produced by ionizing radiation travel to their respective electrode, but there is no multiplication of ion pairs or avalanche. The relatively low speed of the ions and electrons is such that one ionization event overlaps with the next, and the drift of the ions constitutes an electric current (perhaps as low as $10^{-15}$ A), which is amplified and measured. Again, it is not possible to distinguish between the different types of ionizing radiation.

Between these detector types lies the proportional counter. In a proportional counter, the electric field strength set up between the electrodes is higher than in an ionization chamber, so that electron avalanches may be produced. However, the electric field strength is not as high as for a GM tube, so that the gas multiplication is more controlled. The proportional counter relies on gas multiplication to augment the number of electrons produced by the initial interactions of the ionising radiation with the fill gas. In the presence of the electric field, the free electrons will migrate towards the wire anode. The wire is very fine, typically of around 50 μm diameter, so the electric field strength close to the wire is very large. Electrons within a given radius from the anode, typically of around 100 μm, are accelerated to kinetic energies greater than the ionization potential of the fill gas molecules, so that further ionization of the fill gas takes place. The creation of secondary and further ion pairs from a primary ion pair as the electrons travels closer to the anode in this way is called a Townsend avalanche.

The important point with a proportional counter is that the gas multiplication (i.e., the factor by which a single primary ion pair increases the number of free electrons due to its avalanche) is substantially constant under given operational parameters. As such, the size of the charge pulse at the anode is proportional to the number of initial ionization events caused by the radiation. Alpha particles deposit significantly more energy in the fill gas than beta particles, so cause more ionization and therefore larger pulses in the detector. The pulse size can accordingly provide a measure of the type of ionizing radiation and of the energy imparted to the fill gas by it.

Sealed-gas proportional counters contain a sealed fill gas, typically either xenon or krypton, and have a relatively thick detector window, for sealing purposes (such as titanium, at 5-6 mg/cm$^2$). Gas flow proportional counters operate with a continuous flow of fill gas through the detector, typically either argon and methane or argon and carbon dioxide, and generally have a relatively thin detector window (such as aluminized boPET (biaxially-oriented polyethylene terephthalate), available under the name, Mylar®, at around 1 mg/cm$^2$).

One problem with the above types of detector is that they cannot distinguish between beta particles and gamma radiation. This is because gamma radiation can generally produce a similar degree of ionization as beta radiation, either directly in the fill gas or by interacting with the material of the detector chamber itself and producing an energetic electron, resulting in a similar detector output.

In addition, sealed-gas proportional counters tend to have a limited lifetime, because microscopic leaks can lead to contamination of their fill gas. Also, the entrance window generally needs to be thick, to contain the gas, and, as a consequence, the window can cut out low-energy beta radiation. A further disadvantage is their cost of manufacture and repair (due to the requirement to evacuate and bake out the detector and to bond, rather than screw, the window down). Re-filling a sealed-gas detector can cost over half the cost for a new detector.

Gas flow proportional counters do not have these problems and offer the best sensitivity to beta radiation, combined with a relatively low sensitivity to background gamma radiation. Firstly, the window is thin, so low-energy beta radiation is not cut out and may therefore be detected. Secondly, the possibility of photon interaction of (higher-energy) gamma rays in the fill gas in gas flow proportional counters is relatively low.

Having said that, gas flow proportional counters require a continuous flow of fill gas. The fill gas is typically a mixture of argon and methane (either P10, which is 90% (by volume) Ar and 10% $CH_4$, or P7.5, which is 92.5% Ar and 7.5% $CH_4$)

or argon and carbon dioxide, stored in high-pressure cylinders. The physical size of the cylinders and the fact that they are high-pressure and may contain a flammable substance represent health and safety concerns, especially in nuclear installations. Furthermore, it can be difficult to obtain such cylinders, or alternatively to produce the fill gas mixture sufficiently purely, in some countries in the developing world.

It would therefore be desirable to provide an alternative or improved beta radiation monitor.

SUMMARY OF THE INVENTION

According to a first aspect of the invention, there is provided a beta radiation monitor, comprising: a gas flow proportional detector for detecting beta radiation emitted by a beta emitter external to the gas flow proportional detector; a fill gas supply configured to supply a fill gas to the gas flow proportional detector, wherein the fill gas comprises nitrogen; a temperature sensor for measuring temperature; and a controller in communication with the temperature sensor for adjusting an operational parameter of the monitor in accordance with the measured temperature.

A gas flow proportional detector generally offers the best sensitivity to beta radiation, combined with a relatively low sensitivity to background gamma radiation. Configuring a fill gas supply to provide a flow of fill gas comprising nitrogen to the gas flow proportional detector has a number of advantages. There is no longer a need for costly gas bottles, nor the associated need for storage and transport of them. Also, the use of flammable gases can be avoided.

With a nitrogen fill gas, it is possible to obtain similar counting efficiencies as with argon/methane mixtures. The counting efficiency is the ratio of pulses detected (counts) to the number of beta particles actually emitted by the emitter. However, with nitrogen fill gas, the background count rate may be significantly lower for lower gamma photon energies (<200 keV). A significant component of background radiation is from photons which have been Compton scattered and therefore have lower energy. At these lower photon energies, the interactions of the photons tend to be with the fill gas, rather than the chamber wall of the detector. Nitrogen has a significantly lower attenuation coefficient than argon, so the photon interactions with nitrogen fill gas lead to fewer ionizations and therefore a lower background count rate. The improved signal-to-noise ratio with nitrogen fill gas permits lower limits of detection, with the same measuring time and statistical accuracy. This is advantageous for beta radiation monitoring, for which beta-to-background count rates are important.

The inventors have also found that the beta detection efficiency, in particular of higher-energy beta particles, can vary significantly with temperature. As such, the monitor advantageously comprises a temperature sensor in communication with the controller, so that the controller may adjust the applied electric field strength based on the temperature. For a given detector configuration, a relation between the applied potential difference for a desired beta detection efficiency and temperature may first be determined, so that the controller can control the applied potential difference based on this relation. The monitored temperature may be the fill gas temperature itself, or may more conveniently be the ambient temperature.

The temperature-compensation may alternatively be effected in hardware, using a thermistor which adjusts the applied potential difference supplied by the high-voltage supply based on its temperature-dependent resistance.

Alternatively or additionally still, the detection threshold of the comparator of an amplifier amplifying the output pulses from the detector may be adjusted based on the temperature measurement. The aim of the compensation step is to maintain the proportional response of the detector, and this may be achieved by increasing the field strength in the fill gas, to restore the gas multiplication to a desired level, and/or by reducing the detection threshold for a signal pulse to be counted (above noise levels).

Advantageously, the fill gas further comprises a proportion of argon. The fill gas may alternatively or additionally further comprise a proportion of carbon dioxide. During the formation of an electron avalanche, some of the fill gas molecules/atoms can become excited, rather than ionized. Upon subsequent de-excitation, light photons are emitted and can cause ionization of other molecules/atoms, leading to spurious measurements by the detector. Carbon dioxide acts as a polyatomic quenching gas, which preferentially absorbs the light photons, without becoming ionized.

Advantageously, the fill gas supply comprises a nitrogen generator. As such, the monitor can be operated without using cylinders of nitrogen and the nitrogen can simply be produced on site as and when required. The nitrogen generator may be configured to produce substantially oxygen-free nitrogen from ambient air, allowing the beta radiation monitor to be conveniently used at locations and in applications which previously presented logistical, cost, or health and safety concerns.

Ambient air typically comprises approximately 78% (by volume) nitrogen, 21% oxygen, 0.9% argon and 0.04% carbon dioxide. Oxygen is electronegative and would tend to remove free electrons produced by ionizing radiation in the fill gas, thereby degrading gas multiplication. As such, oxygen should not form part of the fill gas for the beta radiation monitor. The nitrogen generator can selectively remove oxygen and other unwanted components from ambient air to produce a nitrogen fill gas with almost no oxygen (depending on local conditions and operational parameters). With a nitrogen generator operating principally to remove oxygen, carbon dioxide and/or argon from ambient air may advantageously be retained in the fill gas from the generator.

Advantageously, for a given detector configuration, a high-voltage supply is used for applying a potential difference across the fill gas and a controller is used for controlling the applied potential difference and thereby the electric field strength at the anode. With the fill gas comprising nitrogen, it has been found that a higher than conventional electric field strength is desirable.

Figure 2:
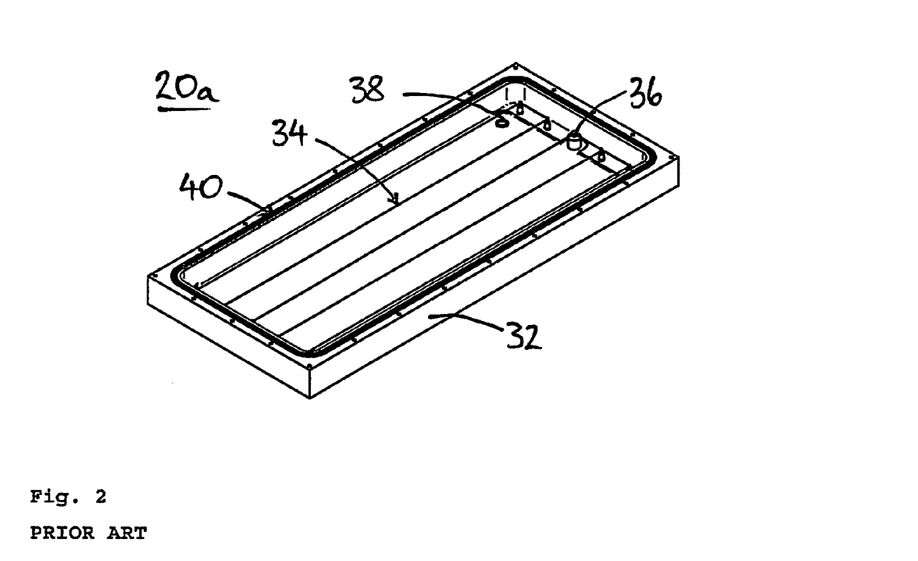
FIG. 2 shows a perspective view of a known gas flow proportional detector, with its window removed.

An exemplary detector configuration (as shown in FIG. 2) has a height (from back wall to detector window) of 19 mm and the wire anode in the detection enclosure has a diameter of 50 µm. Operating conventionally, using a fill gas mixture of argon/methane or argon/carbon dioxide, the desired electric field strength is generally achieved with an applied potential difference of 1.7 kV between the cathode (in particular, the back wall of the detector and the detector window) and the wire anode. However, the inventors have found that operation with this applied potential difference (i.e., electric field strength), using a nitrogen fill gas, did not result in a sufficiently sensitive beta radiation monitor with the above configuration. This is understood to be because nitrogen requires more energy to produce an ion pair and because nitrogen has a lower density than argon, resulting in a longer mean free path length for free electrons in nitrogen. As such, the inventors have found that a higher electric field strength is desirable, in order to obtain similar gas multiplication. When using the above detector configuration, it has been found that an applied potential difference preferably in the range from 3.2 kV to 3.5 kV gives rise to a satisfactory field strength.

Beta radiation monitors, used for detecting contamination, may advantageously comprise a large-area detector. The term, large-area detector, is typically used to refer to detector sensitive areas (e.g., sizes of the detector window) of 100 cm$^2$ or greater.

Advantageously, a plurality of gas flow proportional detectors may be provided in the monitor and these may be arranged in series or parallel combinations, or both. Such a monitor may then be used as a hand and foot monitor or as a whole-body monitor, such as an installed personnel monitor or a personnel contamination monitor.

Gas flow proportional detectors typically have a thin detector window, used to contain the fill gas but to allow beta radiation to pass therethrough. The thin window is liable to damage from sharp objects and to consequential gas leaks. In conventional monitors, using argon/methane or argon/carbon dioxide fill gases, it is possible to use gas sniffers to detect a leak of these gases. However, it is not possible to detect leaking nitrogen in ambient air, which of course already comprises around 80% nitrogen.

The inventors have found that air leaking into a gas flow proportional counter comprising a nitrogen fill gas causes the background count rate of the detector to change by a measurable amount. Advantageously, therefore, the monitor may be arranged as follows. A fill gas inlet flow meter may be installed upstream of the detector or detectors and a fill gas outlet flow meter may be installed downstream of the detector or detectors. A difference in the measured flow rates between the inlet and outlet flow meters (in particular, a reduced flow rate at the outlet flow meter) can be taken to be indicative of a gas leak.

When using a number of gas flow proportional detectors in combination, the actual detector which has a leak needs to be identified. Advantageously, a gas leak monitor for monitoring a respective background count rate detected by each gas flow proportional detector is employed. The gas leak monitor may be arranged to compare the detected background count rate from any particular detector with a previously detected background count rate for that detector, to determine whether a change in the background count rate characteristic of a detector gas leak has occurred.

Alternatively, a detected background count rate for one detector may be compared with the background count rate detected at the same time for other detectors in the combination, to see if the background count rate of that detector is significantly different from the background count rates of the other detectors. The comparison may be made with all detectors of the combination, or only with adjacent detectors in the combination, or only with detectors disposed upstream of the particular detector (when in a series combination).

In these ways, the presence of a gas leak can be confirmed and the faulty detector can be located, for repair/replacement.

According to a second aspect of the present invention, there is provided a method of monitoring beta radiation comprising the steps of: configuring a gas flow proportional detector to detect beta radiation emitted by a beta emitter external to the gas flow proportional detector; supplying a fill gas to the gas flow proportional detector, wherein the fill gas comprises nitrogen; measuring temperature; and controlling an operational parameter of the detector in accordance with the measured temperature.

Other preferred features and advantages of the invention are set out in the description and in the dependent claims which are appended hereto.

BRIEF DESCRIPTION OF THE DRAWINGS

The invention may be put into practice in a number of ways and some embodiments will now be described, by way of non-limiting example only, with reference to the following figures, in which.

DESCRIPTION OF PREFERRED EMBODIMENTS

Figure 1:
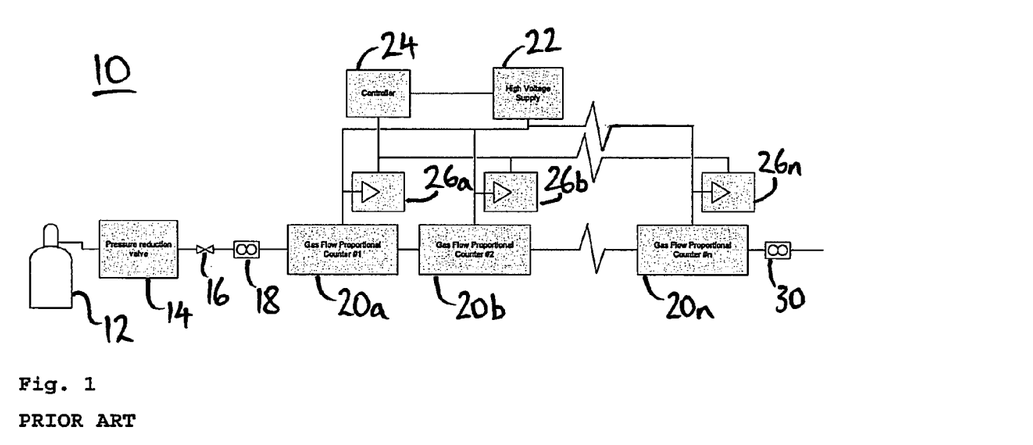
FIG. 1 shows schematically a conventional beta radiation monitor, employing a number of gas flow proportional detectors.

FIG. 1 shows a known beta radiation monitor 10 for detecting beta contamination. The monitor 10 comprises a high-pressure cylinder 12 connected to a pressure-reduction valve 14, a flow control valve 16 and an inlet flow meter 18. The inlet flow meter 18 is connected to an array of gas flow proportional detectors (counters) 20a-n, which are connected in series (although they may alternatively be connected in parallel or a combination of series and parallel). An outlet flow meter 30 is connected to the final gas flow proportional detector 20n. In this way, a fill gas (counting gas) of argon/methane or argon/carbon dioxide can be supplied from the cylinder 12, to flow through each of the above components in turn, through to the outlet flow meter 30, after which it may be vented to atmosphere.

Each gas flow proportional detector 20a-n is connected to a high-voltage supply 22, which is controlled by a controller 24. Each gas flow proportional detector 20a-n is also connected to a respective amplifier 26a-n, for amplifying the electrical output from each detector to provide a measurable signal to the controller 24.

FIG. 2 shows a perspective view of a typical gas flow proportional detector 20a for beta contamination monitoring. The detector 20a comprises a detector body 32, defining a detection enclosure through which the fill gas may flow. The detection enclosure is covered by a thin detector window (not shown), which is fixed to the detector body 32 and seals the detection enclosure with seal 40. The detector 20a has a single fill gas entry port 38 and a single fill gas exit port (not shown).

The detector 20a has five anode wires 34a-e, connected to the high-voltage supply 22 via an electrical feed-through 36. The detector body 32 itself and the detector window (not shown) are used as the cathode, so the high-voltage supply 22 is configured to apply a potential difference (bias voltage) between the wire anode and the detector body cathode.

The detector configuration has the general shape of a rectangular cuboid and a height (from rear wall to entrance window) of 19 mm. The wire anode in the detection enclosure has a diameter of 50 µm. With this configuration, the potential difference desired to provide an acceptable electric field strength in the fill gas is typically around 1.7 kV.

The gas flow proportional detector 20a is a large-area detector; in this example, the detector window has an area of approximately 600 cm$^2$ and is intended for hand and foot or whole-body contamination monitoring.

In use, the pressure reduction valve 14 and flow control valve 16 regulate the flow rate of the fill gas from the cylinder 12 to a suitable value, typically around 25 to 50 cm$^3$/min, although in some systems this may be up to 200 cm$^3$/min. The fill gas flows continuously through the detection enclosures of the gas flow proportional detectors 20a-n, while the flow rate into the detectors is monitored by the inlet flow meter 18 and the flow rate out of the detectors is monitored by the outlet flow meter 30.

Beta particles emitted from an external beta emitter may enter one of the gas flow proportional detectors 20a-n through its detector window (not shown) and interact with the fill gas, resulting in primary ion pairs. The electric field accelerates the free electrons towards the anode wires, generating an electron avalanche. The resulting electrical pulse at the anode is amplified by the respective amplifier 26a-n and pulses above a given amplitude threshold are counted by the controller 24. The background count rate is routinely monitored, so that it may be deducted from the measured count rate, to provide the net count rate due to contamination of a test subject.

Figure 3:
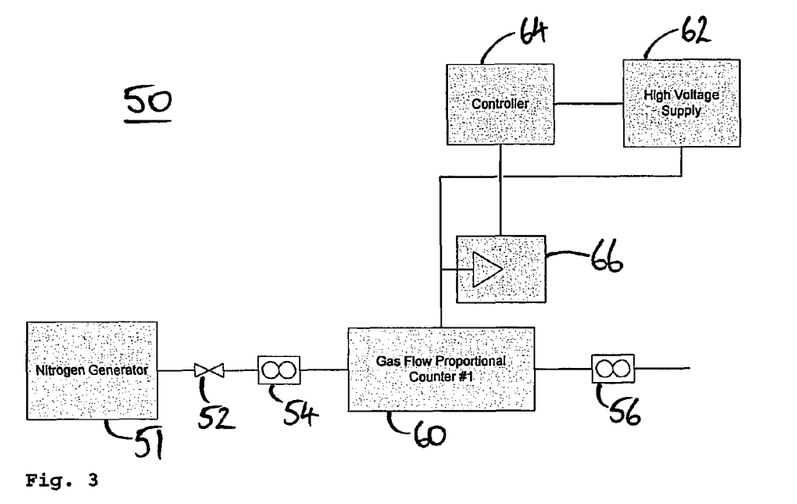
FIG. 3 shows schematically a beta radiation monitor in accordance with a first embodiment of the present invention.

In accordance with an embodiment of the invention, FIG. 3 shows a beta radiation monitor 50, for which the fill gas used comprises nitrogen. The monitor 50 comprises a nitrogen generator 51, connected to a flow control valve 52 and an inlet flow meter 54. The inlet flow meter 54 is connected to a gas flow proportional detector 60 configured for detecting beta radiation and the detector is then connected to an outlet flow meter 56, which is then vented to atmosphere. In this way, nitrogen fill gas may pass from the nitrogen generator 51 through each component in sequence and be discharged from the outlet flow meter 56.

The gas flow proportional detector 60 is connected to a high-voltage supply 62, which is controlled by a controller 64. The output of the detector 60 is connected to an amplifier 66 for amplifying the output pulses from the detector, to provide measurable signals at the controller 64.

In use, the nitrogen generator supplies a nitrogen fill gas to the gas flow proportional counter 60. The flow rate of the nitrogen fill gas is regulated by the flow control valve 52 and the flow rate into the detector 60 is measured by the inlet flow meter 54. The high-voltage supply 62 applies a high-voltage potential difference across the nitrogen fill gas, between the wire anode (or anodes, if more than one wire anode is used) and the detector body cathode. The nitrogen fill gas leaves the gas flow proportional detector 60 and its flow rate is measured by the outlet flow meter 56, before the gas is vented to atmosphere.

Beta particles entering the gas flow proportional detector 60 through its detector window (not shown) may interact with the nitrogen fill gas. Ionisation of the fill gas results in primary ion pairs, the free electrons of which are drawn to the wire anode, creating an electron avalanche in the process. The charge pulse at the anode is amplified by the amplifier 66, to provide a signal above a given amplitude threshold, for measurement by the controller 64.

From generation of a pulse at the wire anode, to be detected, the output signal passes through an amplifier, a comparator and a counter. The amplifier 66 may be configured with a processor to allow it to incorporate all of these functions itself. The amplifier may then communicate intelligently with the controller 64, providing actual counts. Alternatively, the amplifier may incorporate only the amplifier and comparator functions, so that the controller detects the counts.

With a fill gas comprising nitrogen, it is possible to obtain similar counting efficiencies as with argon/methane mixtures. In addition, nitrogen has a significantly lower attenuation coefficient than argon, so lower-energy background photons entering the detector lead to fewer ionisations and therefore a lower background count rate. An improved source-to-background ratio advantageously decreases the minimum detectable activity for the same counting time and statistical certainty. Furthermore, although bottled nitrogen could be used, the use of a nitrogen generator removes the need for high-pressure gas cylinders and the associated cost, logistical and health and safety concerns.

Any suitable nitrogen generator may be used for the nitrogen generator 51. The currently preferred generator is the GeniSys MircroGeN$_2$, available from Texol Products Ltd. of Dundee, Scotland. This nitrogen generator is conveniently small and has a built-in compressor, so that no external tubing is required. Compressed ambient air is filtered, to remove contaminants and bulk moisture, and passes into a column containing a carbon molecular sieve. The sieve adsorbs oxygen and leaves the dry nitrogen free to flow into a reservoir. From the reservoir, the nitrogen flows via a pressure and flow regulator out of the generator.

With such a nitrogen generator, it is possible to produce flows of up to 200 cm$^3$/min of substantially oxygen-free nitrogen. In fact, the inventors have found that it is possible to operate the nitrogen generator at flow rates up to 700 cm$^3$/min with an acceptably low level of oxygen. Flow rates higher than this tended to include too much oxygen.

Of course, depending on the intended application, other nitrogen generators may be used. For example, in contamination monitoring in changing rooms, it may be preferable to use a larger nitrogen generator.

The fill gas produced in this way from ambient air principally comprises nitrogen. However, it may also comprise small proportions of argon (which, as known, can serve as a counting gas) and/or carbon dioxide (which can serve as a quenching gas), retained from ambient air.

With the detector configuration of FIG. 2, the typical voltage bias applied between the electrodes of a conventional gas flow proportional detector is around 1.7 kV. However, the inventors have found that simply using a nitrogen fill gas with an otherwise conventional beta radiation monitor configuration resulted in a very low, if not zero, beta detection efficiency. The inventors understand this to be because nitrogen requires more energy to produce an ion pair and because electrons have a longer mean free path in nitrogen than in argon. The inventors have found that, by increasing the electric field strength (by applying a higher voltage bias) across the nitrogen fill gas, it is possible to increase the gas multiplication to similar levels as for argon, without moving the ionisation response into to the Geiger region (where the output pulse is no longer proportional to the ionisation caused by the beta particle responsible for the pulse).

The inventors have found that, when using a fill gas comprising nitrogen with the detector configuration of FIG. 2, the applied potential difference should preferably be in the range from 3.2 kV to 3.5 kV. The high-voltage supply 62 is therefore controlled by the controller 64 to apply a potential difference across the fill gas in this range. Since it is the electric field strength at the anode which is important for proportional detection, when using other detector configurations (e.g., different detector height or different wire anode diameter), the desired applied voltage may lie outside the above range and may be determined by producing a graph similar to that shown in FIG. 4.

Figure 4:
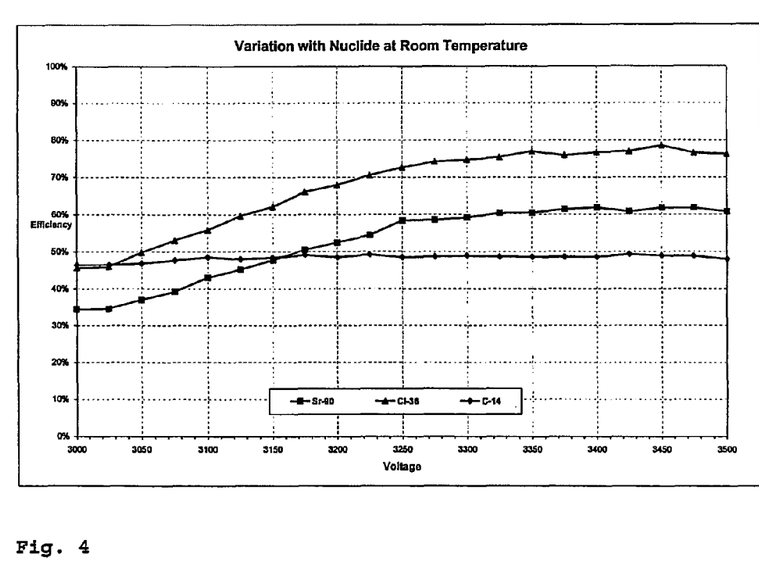
FIG. 4 shows a graph of beta detection efficiency with applied voltage, for a number of beta emitters.

FIG. 4 shows a graph of the variation in beta detection efficiency with applied potential difference across the nitrogen fill gas (the examples discussed herein are all based on the dimensional configuration of the detector shown in FIG. 2). The graph includes plots for three different beta-emitting isotopes; namely, carbon-14, chlorine-36, and strontium-90 (which decays to another beta emitter, yttrium-90). Carbon-14 decays to produce a low-energy beta particle; chlorine-36 decays to produce a medium-energy beta particle; and strontium-90 decays to produce a high-energy beta particle.

The graph shows an applied voltage range from 3.0 kV to 3.5 kV. Higher applied voltages are not shown on the graph, since the detector count rate increases dramatically, as the output response enters the Geiger region and is therefore not suitable for proportional detection.

It is preferred to apply a potential difference from the plateau region of the efficiency plots, since here the efficiency is towards or at a maximum value in the proportional region and does not change significantly with small variations in the applied voltage. As can be seen from FIG. 4, the plateau is relatively long for low-energy beta particles (from carbon-14), while medium- and high-energy beta particles (from chlorine-36 and strontium-90, respectively) have relatively short plateaux. It can be seen that the plateau regions for the three radionuclides generally extend between an applied voltage of 3.2 kV to 3.5 kV. It is desirable, therefore, to apply a voltage which lies within the plateau regions of these three beta emitters (and, more generally, of as many commonly encountered beta emitters as is practicable for any given detector configuration).

Figure 5:
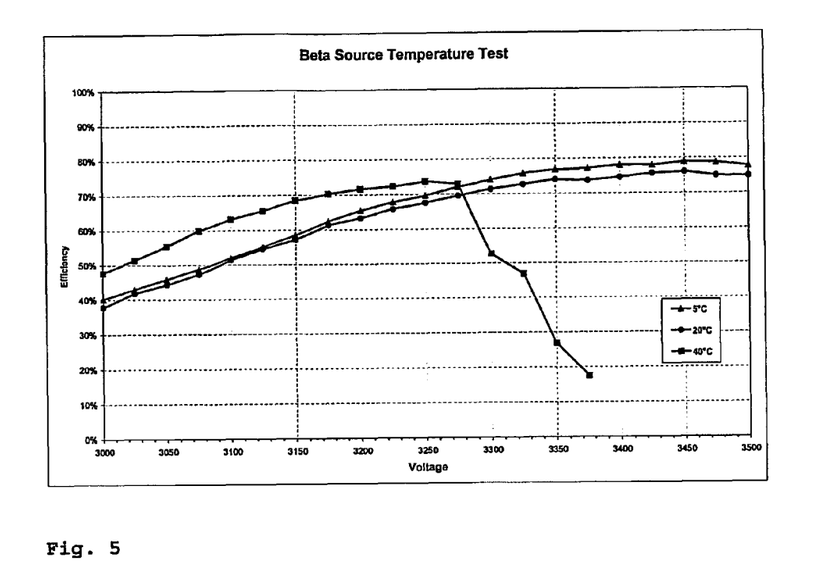
FIG. 5 shows a graph of beta detection efficiency with applied voltage, at a number of ambient temperatures.

FIG. 5 shows a graph of the variation in beta detection efficiency with applied voltage between 3.0 kV and 3.5 kV. The beta emitter used was chlorine-36, employed as a standard source of known activity. Three sets of measurements are shown, each taken at a different ambient temperature of the beta radiation monitor; namely, at 5° C., at 20° C., and at 40° C., representing a typical range of working temperatures for beta contamination monitors around the world.

It is clear from the graph that the beta detection efficiency varies significantly with ambient temperature. At lower temperatures up to around room temperature, the graph shows plateaux with applied voltages between 3.3 kV and 3.5 kV. However, at higher ambient temperatures, the beta detection efficiency falls significantly above an applied voltage of 3.28 kV. As such, a desirable applied voltage at an ambient temperature of 40° C. would lie in the region generally from 3.2 kV to 3.28 kV.

In a further embodiment of the invention, then, the applied potential difference is adjusted in dependence upon the ambient temperature of the beta radiation monitor, to maintain the optimum or desired detection efficiency. The temperature characteristic of the beta detection monitor is first determined by plotting beta detection efficiency against applied voltage for a number of ambient temperatures across the range of interest. The detection efficiency plateau for each plot is then found and the mid-point of each plateau is logged. It should be noted that the term "mid-point" may not necessarily be a mathematical middle value in the plateaux; in particular, because it is not straightforward to determine where each plateau begins and ends. As such, the term is used to mean a desired, selected point from within the plateau region. Selecting the mid-point of each plateau allows for some degree of variation in the applied voltage without significantly affecting the detection efficiency. In this way, a temperature characteristic for the beta detection monitor, in the form of a plot of plateau mid-point voltage against ambient temperature may be determined.

Figure 6:
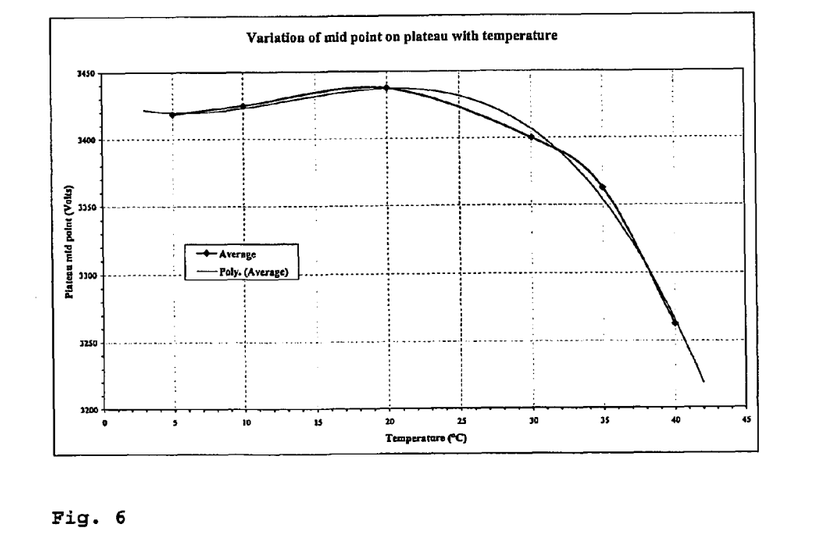
FIG. 6 shows a graph of the variation of the applied voltage lying at the mid-point of the plateau in the beta detection efficiency curve with ambient temperature.

FIG. 6 shows such a temperature characteristic. The plateau mid-point voltages for chlorine-36, at six different temperatures in the range from 5° C. to 40° C., were measured using multiple detectors. The average of the plateau mid-point voltages at each temperature was then taken. FIG. 6 shows the plot of the average mid-point voltage against temperature. The relation between applied potential difference for a desired beta detection efficiency and ambient temperature is non-linear, so a polynomial expression is calculated to fit the results. A plot of the polynomial fit is also shown in FIG. 6.

Figure 7:
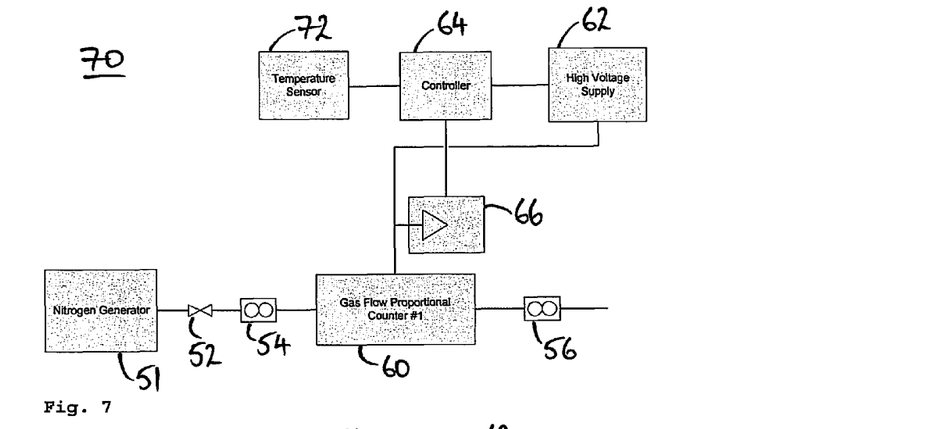
FIG. 7 shows schematically a beta radiation monitor in accordance with a second embodiment of the convention.

FIG. 7 shows an embodiment of the invention which makes use of the above temperature-compensation technique. Like features from FIG. 3 are referred to with the same reference numerals. The embodiment shown in FIG. 7 is similar to that shown in FIG. 3, except that the beta detection monitor 70 includes a temperature sensor 72 for measuring the ambient temperature of the monitor. The temperature sensor 72 is in communication with the controller 64, which is configured to adjust the bias voltage applied to the gas flow proportional detector 60 by the high-voltage supply 62, based on the temperature characteristic measured for the particular beta radiation monitor.

In use, the beta radiation monitor 70 operates in a similar way to the beta radiation monitor 50. However, during operation, the temperature sensor 72 measures the ambient temperature of the monitor 70. The controller 64 receives the temperature reading from the temperature sensor 72 and ensures that the high-voltage supply 62 applies the appropriate bias voltage to the gas flow proportional detector 60, according to the temperature characteristic previously determined.

The temperature-compensation technique, as described above, may be managed under software control. The software controller follows an algorithm to monitor the temperature, determine the desired bias voltage to apply and adjust the high-voltage supply accordingly. The effect of the bias voltage adjustment is to maintain the gas multiplication at a desired level for proportional detection, so that the controller 64 is able to receive a pulse from the amplifier 66 representative of a beta particle detection.

In an alternative embodiment, this effect may be achieved in a different manner. The amplifier 66 operates as an amplifier and a comparator. A pulse received from the gas flow proportional detector 60 is amplified with a given gain. The comparator then checks whether the amplified signal is above a detection threshold (i.e., that the signals is not simply noise). The comparator typically also has an upper threshold cut-off to discount pulses caused by alpha particles (which deposit more energy than beta particles and give rise to significantly larger output pulses). Therefore, instead of (or, in some embodiments, in addition to) adjusting the high-voltage supply, the controller 64 may adjust the detection threshold of the amplifier 66. By lowering the detection threshold in the comparator, although the fill gas may be operating with lower gas multiplication so that the output pulses are smaller, the lower detection threshold will mean that those pulses may still be detected.

Alternatively still, the temperature compensation may be effected in hardware, rather than software. For example, the temperature sensor may comprise a thermistor configured with the high-voltage supply 62. In this way, the resistance of the thermistor will vary according to its temperature, thereby adjusting the voltage bias applied by the high-voltage supply 62.

While the inventors believe that monitoring the ambient temperature of the beta radiation monitor 70 provides an effective temperature gauge for temperature compensation, in a further embodiment, a temperature sensor is installed within the gas flow circuit of the beta radiation monitor (e.g., in a gas pipe or in the detection enclosure of the gas flow proportional detector), to measure the temperature of the fill gas itself.

Figure 8:
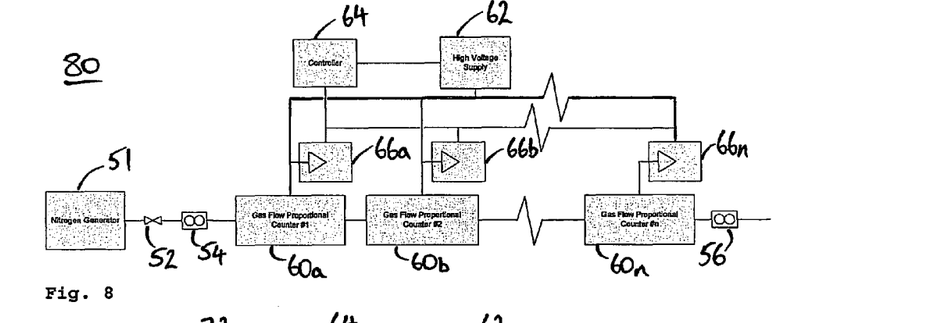
FIG. 8 shows a beta radiation monitor in accordance with a further embodiment of the invention.

FIG. 8 shows a beta radiation monitor 80, according to a further embodiment of the invention. Beta contamination monitors typically employ multiple gas flow proportional detectors in combination. For example, hand and foot monitors employ a 570 $cm^2$, large-area detector for each foot and two 460 $cm^2$, large-area detectors for each hand (one above and one below). Whole-body beta contamination monitors typically employ 18 body detectors, four hand detectors, one or two foot detectors, and one head detector. The beta radiation monitor 80 accordingly comprises two or more gas flow proportional detectors (60a, 60b, . . . , 60n). Each detector 60a-n has associated with it a respective amplifier 66a-n. In this embodiment, the high voltage supply 62 and the controller 64 are in communication with each of the detector and amplifier units.

The nitrogen generation and gas flow configuration of the beta radiation monitor 80 is similar to that of the monitor 50, but with the fill gas, comprising nitrogen, flowing through each gas flow proportional counter 60a-n in series. Also, the outlet flow meter 56 is disposed downstream of the final gas flow proportional detector 60n, to measure the flow rate leaving the detector array as a whole. It will be appreciated that, depending on the configuration and layout of the gas flow proportional detectors in any particular monitor, the detectors 60a-n may be arranged fully in series, fully in parallel, or in a combination of series and parallel.

Figure 9:
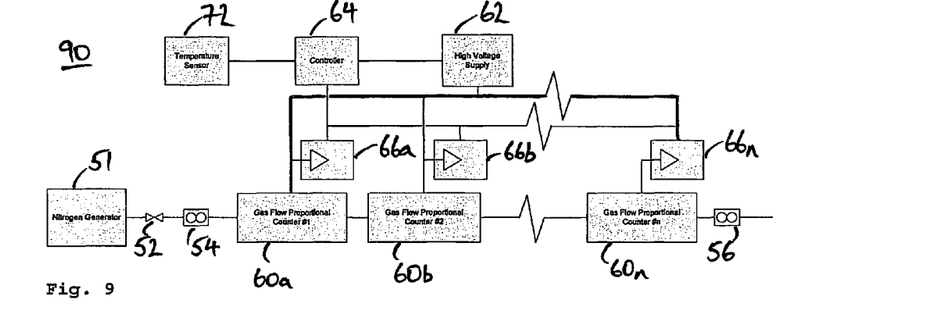
FIG. 9 shows a beta radiation monitor in accordance with a still further embodiment of the invention.

FIG. 9 shows a further embodiment of the invention, in which several gas flow proportional detectors 60a-n are employed, as described with reference to FIG. 8, and for which temperature compensation is provided. The beta radiation monitor 90 is similar to the monitor 80, but includes a temperature sensor 72, in communication with the controller 64, for adjusting the operation of the monitor to take into account variation in temperature. It will be understood that the various alternatives for implementing the temperature-compensation technique, discussed above, are equally applicable to the beta radiation monitor 90.

Gas flow proportional counters have a thin entrance window. This window can easily become damaged in use, from sharp objects and the like. If a detector window becomes compromised, the resulting gas leak allows air into the nitrogen-filled detection enclosure. This can give rise to spurious measurements. In the above embodiments, the inlet and outlet flow meters 54, 56 monitor the inlet and outlet flow rates of the fill gas. When there is a change in outlet flow rate, compared to inlet flow rate (in particular, a reduced outlet flow rate), this indicates the presence of a gas leak. Although not shown as such, the flow meters 54, 56 are preferably electronic flow meters in communication with the controller 64. In this way, the presence of a gas leak is detected automatically and the controller may automatically initiate a routine for finding the detector with the gas leak. If the gas leak detection routine is not initiated immediately upon indication of a gas leak, the effect of the leak may spread from the faulty detector to other detectors, making it less straightforward to identify the faulty detector. If the flow rate change is detected early on (automatically), the progress of the leak can be monitored from the outset.

With conventional gas flow proportional counters, employing a fill gas of argon/methane or argon/carbon dioxide, gas sniffers may be used to detect leakage of these gases from the detector. However, this is not possible with a nitrogen fill gas, given the high proportion of nitrogen in ambient air.

The inventors have noted that the presence of air leaking into a nitrogen-filled gas flow proportional detector causes the background count rate to change by a detectable amount. If multiple anodes are used within the detection enclosure, then all of those anodes will detect the change in count rate within a short time interval from the occurrence of the leak, while, within that short time interval, surrounding detectors will not. Should all detectors measure a change in count rate simultaneously, this would indicate a general change in background radiation, such as from movement of a radiation source, and not a leak.

In a fully parallel detector configuration, the leaking detector may be isolated and repaired or replaced. In a series configuration of detectors, over time from the initial leak, the change in count rate migrates to other, downstream detectors, but not to detectors towards the inlet.

Accordingly, in embodiments of the invention employing multiple gas flow proportional detectors 60a-n, such as the monitors 80, 90 shown in FIGS. 8 and 9, the background count rate measured by each gas flow proportional detector is routinely checked by the controller 64. If a change in background count rate is detected, in one embodiment, the controller 64 then checks and stores the background count rate from each gas flow proportional detector 60a-n. This step is repeated at short intervals, typically of the order of minutes. A gas leak can be detected by analysing the sequence of stored background count rates from the initial detected change, to determine whether and how the background count rate change has migrated through the other detectors, in the characteristic way of a gas leak, rather than being due to an amplifier or anode fault, for example. A preferred manner of displaying the results of the gas leak detection routine is to provide a graphical representation of the detector layout, indicating how the gas flows from detector to detector, and showing the count rate variation for each detector. With this technique, it is possible to confirm that the fault is due to gas leakage and which detector initiated the fault and needs to be changed or repaired.

As indicated, the gas leak monitor (controller 64) may monitor the change in background count rate over time for each respective gas flow proportional detector 60a-n. Alternatively, the gas leak monitor can be arranged to monitor the background count rates detected simultaneously from a given detector and its immediate neighbours. In this way, assuming the background count rates are the same for each of the detectors under normal operation, this comparison will determine whether the background count rate has increased relative to an upstream detector and whether the increase in background count rate has migrated to a downstream detector. Other detector comparison options will be readily apparent.

Although the gas flow proportional detectors have been described above with one or more anode wires acting as a single electrode and connected through a single electrical feed-through, multiple anode wires, connected to their own, respective amplifier circuits through individual feed-throughs may alternatively be used. Multiple anode wires can be used to reduce the background count rate and improve statistical accuracy.

Many combinations, modifications, or alterations to the features of the above embodiments will be readily apparent to the skilled person and are intended to form part of the invention.

The invention claimed is:

1. A beta radiation monitor, comprising:
   a gas flow proportional detector for detecting beta radiation emitted by a beta emitter external to the gas flow proportional detector;
   a fill gas supply configured to supply a fill gas to the gas flow proportional detector, wherein the fill gas comprises nitrogen;
   a temperature sensor for measuring temperature; and
   a controller in communication with the temperature sensor for adjusting an operational parameter of the monitor in accordance with the measured temperature.

2. The beta radiation monitor of claim 1, wherein the operational parameter comprises a potential difference applied across the fill gas, wherein the relation between applied potential difference for a desired beta detection efficiency and ambient temperature is non-linear.

3. The beta radiation monitor of claim 2, further comprising a high-voltage supply comprising a thermistor and being configured to apply the potential difference across the fill gas, wherein the temperature sensor and the controller are together provided by the thermistor.

4. The beta radiation monitor of claim 1, wherein the operational parameter comprises a beta radiation detection threshold of the detector.

5. The beta radiation monitor of claim 1, wherein the fill gas supply comprises a nitrogen generator.

6. The beta radiation monitor of claim 5, wherein the fill gas further comprises a first proportion of argon and/or a second proportion of carbon dioxide.

7. The beta radiation monitor of claim 1 comprising a plurality of such gas flow proportional detectors, the beta radiation monitor further comprising a gas leak monitor for monitoring a respective background count rate detected by each gas flow proportional detector and comparing the detected background count rate with a respective previously detected background count rate to determine a change in one or more of the background count rates characteristic of a detector gas leak.

8. The beta radiation monitor of claim 7, further comprising a fill gas inlet flow meter upstream of the gas flow proportional detectors and a fill gas outlet flow meter downstream of the detectors, the inlet and outlet flow meters being for detecting a change in a rate of flow of fill gas through the monitor indicative of a detector gas leak and being configured in communication with the gas leak monitor, the gas leak monitor being arranged to initiate monitoring of the background count rates to determine a difference in one or more of the background count rates characteristic of a detector gas leak automatically when the outlet flow meter detects the change indicative of a detector gas leak.

9. The beta radiation monitor of claim 1 comprising a plurality of such gas flow proportional detectors, the beta radiation monitor further comprising a leak monitor for monitoring a respective background count rate detected by each gas flow proportional detector and comparing one or more detected background count rate with selected respective other detected background count rates to determine a difference in one or more of the background count rates characteristic of a detector gas leak.

10. The beta radiation monitor of claim 1, wherein the fill gas supply comprises a pressure regulator.

11. The beta radiation monitor of claim 1, wherein the fill gas supply comprises a generator configured to generate a fill gas comprising dry nitrogen by removing oxygen from ambient air while retaining carbon dioxide and argon.

12. The beta radiation monitor of claim 1, further comprising a high-voltage supply configured to apply a potential difference across the fill gas, wherein the monitor has a beta detection efficiency that falls with higher applied potential difference at higher ambient temperatures.

13. The beta radiation monitor of claim 1, further comprising a high-voltage supply configured to apply a potential difference across the fill gas, wherein the monitor has a beta detection efficiency that falls with higher applied potential difference at a temperature of 40 degrees C.

14. The method of claim 13, wherein the fill gas comprises dry nitrogen generated by removing oxygen from ambient air while retaining carbon dioxide and argon.

15. The beta radiation monitor of claim 1, further comprising a high-voltage supply configured to apply a potential difference across the fill gas, wherein the high-voltage supply is configured to adjust the applied potential difference downward at a higher ambient temperature.

16. A method of monitoring beta radiation comprising the steps of:
   configuring a gas flow proportional detector to detect beta radiation emitted by a beta emitter external to the gas flow proportional detector;
   supplying a fill gas to the gas flow proportional detector, wherein the fill gas comprises nitrogen;
   measuring temperature; and
   controlling an operational parameter of the detector in accordance with the measured temperature.

17. The method of claim 16, wherein the operational parameter comprises a potential difference applied across the fill gas, wherein the relation between applied potential difference for a desired beta detection efficiency and ambient temperature is non-linear.

18. The method of claim 17, wherein the temperature-measuring and operational parameter-controlling steps are effected by a thermistor.

19. The method of claim 16, wherein the operational parameter comprises a beta radiation detection threshold of the detector.

20. The method of claim 16, wherein the fill gas is supplied by a nitrogen generator.

21. The method of claim 20, wherein the fill gas further comprises a first proportion of argon and/or a second proportion of carbon dioxide.

22. The method of claim 16, further comprising the step of applying a potential difference across the fill gas, the applied potential difference being from 3.2 kV to 3.5 kV.

23. The method of claim 16, further comprising the steps of:
   configuring a plurality of such gas flow proportional detectors to detect beta radiation emitted by a beta emitter external to the gas flow proportional detectors; and
   supplying the fill gas to each of the gas flow proportional detectors.

24. The method of claim 23, further comprising the steps of:
   monitoring a respective background count rate detected by each gas flow proportional detector; and
   comparing the detected background count rate with a respective previously detected background count rate to determine a change in one or more of the background count rates characteristic of a detector gas leak.

25. The method of claim 23, further comprising the steps of:
monitoring a respective background count rate detected by each gas flow proportional detector; and
comparing one or more detected background count rate with selected respective other detected background count rates to determine a difference in one or more of the background count rates characteristic of a detector gas leak.

26. The method of claim 25, further comprising the steps of:
monitoring inlet and outlet flow rates of fill gas respectively into and out of the gas flow proportional detectors;
comparing the inlet and outlet flow rates to determine a difference indicative of a detector gas leak; and
initiating monitoring and comparing of the background count rates to determine a difference in one or more of the background count rates characteristic of a detector gas leak automatically when the difference indicative of a detector gas leak is determined.

27. The method of claim 16, wherein the operational parameter comprises a potential difference across the fill gas, wherein the applied potential difference lies within a plateau region of detector efficiency plots versus voltage for beta particles emitted from chlorine-36.

28. The method of claim 16, wherein the operational parameter comprises a potential difference across the fill gas, wherein the applied potential difference lies within a plateau region of detector efficiency plots versus voltage for beta particles emitted from each of carbon-14, chlorine-36, and strontium-90.

29. The method of claim 16, wherein the supplying step further comprises regulating the pressure of the fill gas.

30. The method of claim 16, further comprising the step of applying a potential difference across the fill gas, wherein a detection efficiency of monitoring the beta radiation falls with higher applied potential difference at higher ambient temperatures.

31. The method of claim 16, further comprising the step of applying a potential difference across the fill gas, wherein a detection efficiency of monitoring the beta radiation falls with higher applied potential difference at a temperature of 40 degrees C.

32. The method of claim 16, further comprising the step of applying a potential difference across the fill gas, wherein the applied potential difference is adjusted downward at a higher ambient temperature.

* * * * *